UNITED STATES PATENT OFFICE.

KNUT ÅSLUND AND TEOFRON BOBERG, OF LONDON, ENGLAND.

AROMATIZING DRY COFFEE EXTRACT.

1,214,875.

Specification of Letters Patent.

Patented Feb. 6, 1917.

No Drawing.

Application filed February 2, 1916. Serial No. 75,682.

*To all whom it may concern:*

Be it known that we, KNUT ÅSLUND and TEOFRON BOBERG, subjects of the King of Sweden, residing at Fairlawn, Clarence Road, Clapham Park, London, England, Great Britain, have invented new and useful Improvements in Aromatizing Dry Coffee Extract, of which the following is a specification.

Our invention relates to improvements in aromatizing dry coffee extract such as is obtained by treating ground roasted coffee beans with hot water and evaporating the solution, and the object of our improvements is to produce a dry coffee extract which when dissolved in hot water will give a beverage possessing flavor and aroma very closely approaching that made from freshly ground coffee beans.

We have observed that ordinary coffee contains a much larger proportion of the aroma-possessing substances than is necessary, and that if the amount thereof is reduced until only some two or three per cent. remains no perceptible difference is produced as regards the fragrance of the resulting beverage. According to our invention, therefore, the aroma is imparted to the dry coffee extract by adding to the latter a small quantity of finely ground roasted coffee beans.

In carrying our invention into effect, the greater portion of a quantity of roasted coffee beans is ground and extracted with hot water. The solution is then filtered and evaporated and the resulting residue reduced to a fine powder. One to five per cent. by weight of the original coffee beans ground to powder of such fineness as to be capable of suspension in the subsequently prepared beverage, is then intimately mixed with the dried and ground extract made from the greater portion of the coffee beans above referred to. If desired the resulting mixture (which constitutes the dry coffee composition produced in accordance with this invention) may be made into pellets by any suitable means. The quantity of insoluble matter introduced with the finely ground beans is so small as to produce no objectionable quantity of sediment in the beverage.

In finely grinding the roasted coffee beans, as above referred to, the natural fat present may be found to cause formation of sticky lumps which may interfere with the grinding. In such case the effect of the fat may be neutralized by adding some of the dry coffee extract in order to reduce the average fat content of the mass being ground.

We claim:

1. In the grinding of roasted coffee beans into a fine powder, the addition to such beans of a suitable quantity of dry coffee extract to prevent the formation of a sticky mass while grinding.

2. A dry coffee composition for producing a beverage composed of ground dry extract derived from coffee beans intimately mixed with a fine powder derived from grinding roasted coffee beans.

3. A dry coffee composition for producing a beverage composed of ground dry extract of roasted coffee beans intimately mixed with a fine powder derived from grinding roasted coffee beans, the relative amount of the said powdered coffee beans being from one to five per cent. by weight of the original coffee beans used in preparing the extract and the fine powder.

KNUT ÅSLUND.
TEOFRON BOBERG.

Witnesses:
WALTER BAINER,
H. C. FOWLER.